Sept. 29, 1970 L. F. BENDER 3,531,217
VACUUM OPERATED TIMING DEVICE FOR FLUID CONVEYING APPARATUS
Filed Jan. 6, 1969 3 Sheets-Sheet 1
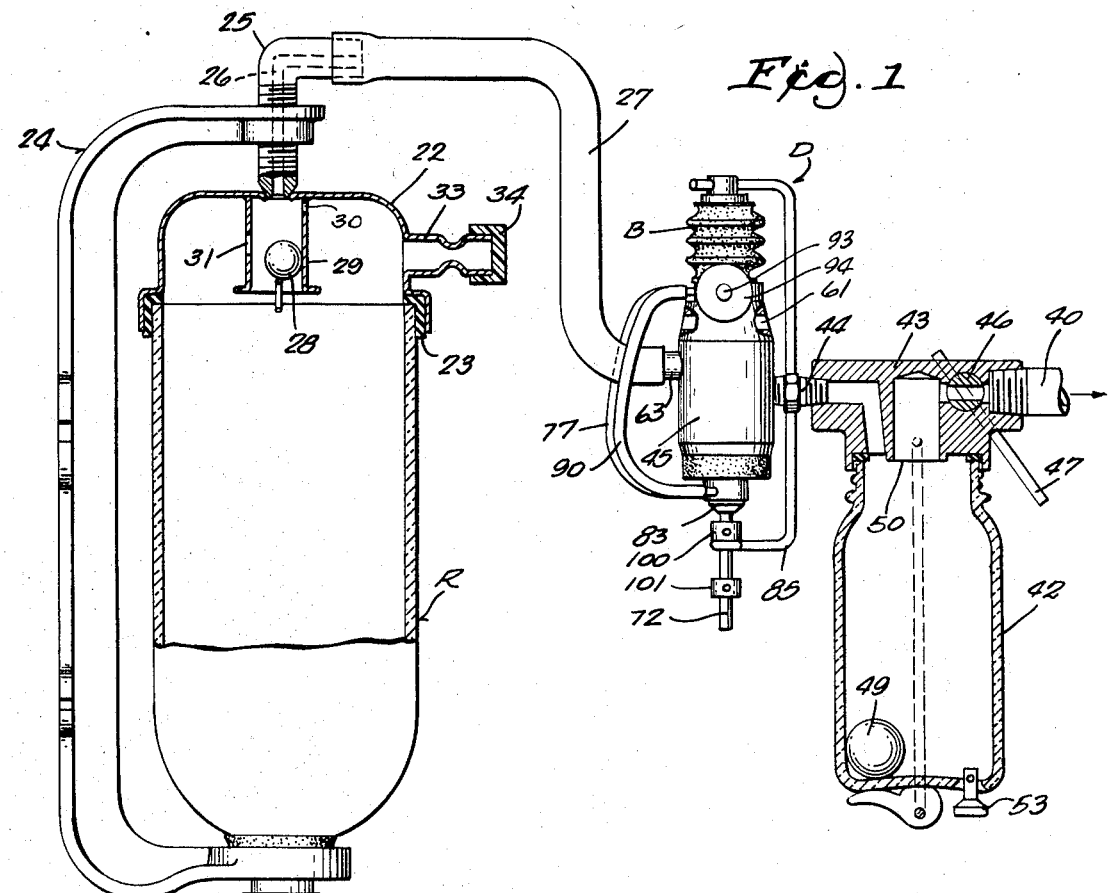
Fig. 1
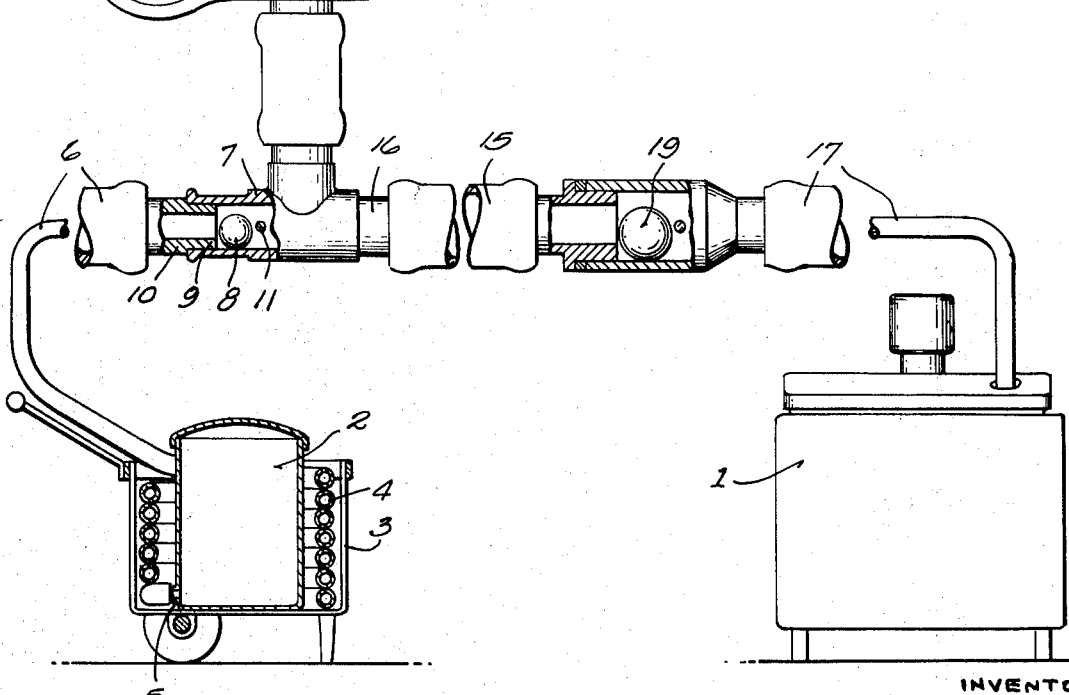
INVENTOR:
LLOYD F. BENDER
BY: James E. Nilles
ATTORNEY Sept. 29, 1970     L. F. BENDER     3,531,217
VACUUM OPERATED TIMING DEVICE FOR FLUID CONVEYING APPARATUS
Filed Jan. 6, 1969     3 Sheets-Sheet 2

INVENTOR:
LLOYD F. BENDER

BY: James E. Nilles
ATTORNEY

Sept. 29, 1970            L. F. BENDER            3,531,217
VACUUM OPERATED TIMING DEVICE FOR FLUID CONVEYING APPARATUS
Filed Jan. 6, 1969            3 Sheets-Sheet 3
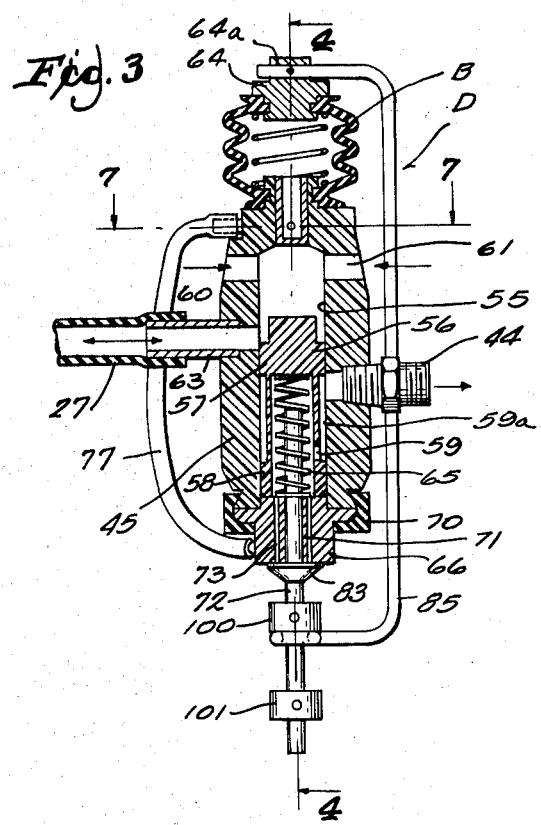
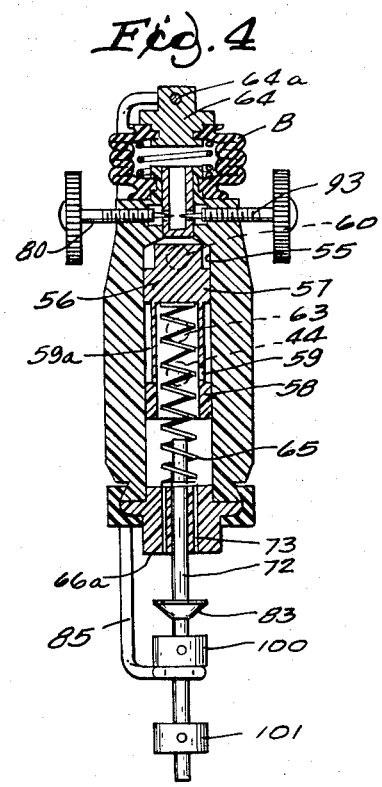
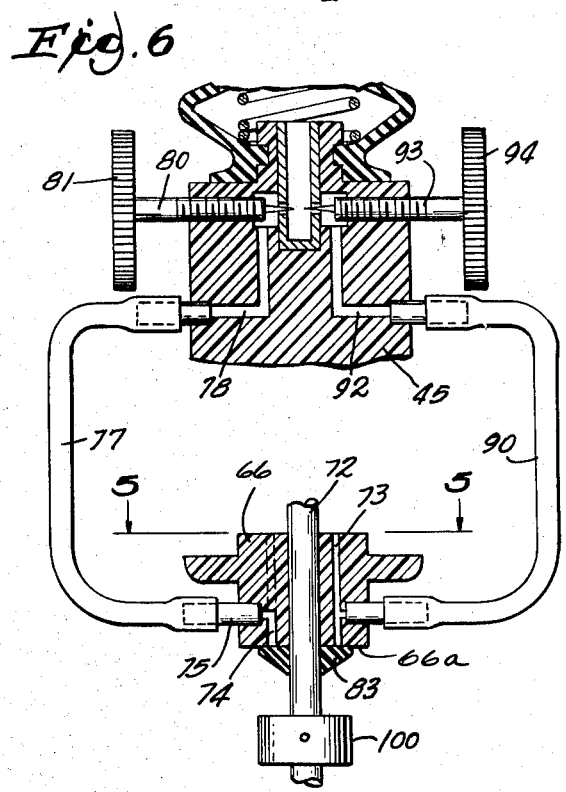
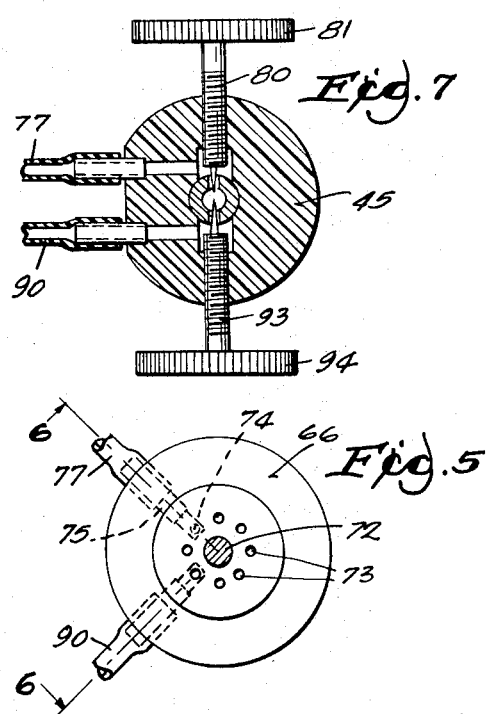
INVENTOR:
LLOYD F. BENDER
BY: James E. Nilles
ATTORNEY United States Patent Office 3,531,217
Patented Sept. 29, 1970

3,531,217
VACUUM OPERATED TIMING DEVICE FOR FLUID CONVEYING APPARATUS
Lloyd F. Bender, Hayward, Wis. 54843
Filed Jan. 6, 1969, Ser. No. 789,334
Int. Cl. A01j 7/00; F04f 3/00; F16k 31/36
U.S. Cl. 417—134                            4 Claims

ABSTRACT OF THE DISCLOSURE

Fluid conveying apparatus having a fluid receiver for alternately accumulating fluid and then releasing the fluid, including an improved automatic and vacuum operated timing device for alternately permitting vacuum or atmosphere to enter the receiver. The apparatus is used to convey fluid from one location to another, for example, milk from a transfer tank to a cooler. After conveying the fluid, the apparatus can also be rearranged so as to circulate a cleaning solution through the entire apparatus for complete and thorough in-place-cleaning.

BACKGROUND OF THE INVENTION

This invention pertains generally to fluid handling equipment of the type usually found in dairy apparatus for conveying milk from one station to another. This type of apparatus has a fluid receiver, sometimes referred to as a releaser, with a timing device that alternately permits atmosphere or vacuum to enter the releaser to thereby cause it to discharge or fill with fluid.

An example of one general type of this apparatus is shown in my U.S. Pat. No. 3,191,576 which issued on June 29, 1965 and entitled "Milk Line Releaser and Washer Apparatus," and it is of the type having a pulsator-control discharge and actuated by a solenoid operated two way valve. Another example of prior art devices of this general character is shown in my U.S. Pat. 3,310,061 which issued on Mar. 2, 1967 and is entitled "Milk Line Equipment"; that prior art apparatus uses a single releaser vessel and is also automatically controlled, by means of a timer.

These prior art devices have proved to be highly successful, but they require the use of a considerable amount of apparatus, such as electrical timers, solenoids, and slide valves.

SUMMARY OF THE INVENTION

The present invention provides fluid conveying apparatus having a fluid receiver for alternately accumulating and releasing the fluid, and which apparatus includes an improved and automatically operated device for alternately permitting either vacuum or atmospheric pressure to enter the fluid receiver. This device utilizes a constant source of vacuum, which vacuum is automatically admitted to or blocked from the receiver by a shiftable valve element. The valve element is automatically shifted in timed sequence under influence of the vacuum.

BRIEF DESCRIPTION OF THE DRAWINGS

FIG. 1 is an elevational view of a fluid conveying apparatus made in accordance with the present invention, certain parts being shown as broken away or in section for clarity in the drawings, the parts being arranged for conveying a fluid, such as milk, from a portable tank to a cooler;

FIG. 3 is an elevational, cross-sectional view of the timing device shown in FIG. 1, but on an enlarged scale, and showing the device in the position for admitting atmosphere to the receiver, thereby causing the receiver to discharge;

FIG. 4 is an elevational cross-sectional view through the timing device shown in FIG. 3, but taken along the line 4—4 in FIG. 3 and showing the shiftable valve element moved to a position in which vacuum is admitted to the fluid reciver, thereby causing the receiver to fill;

FIG. 5 is a sectional view taken generally along the line 5—5 in FIG. 6;

FIG. 6 is a fragmentary, vertical sectional view through the device shown in FIGS. 3, 4 and 5, with certain parts broken away or removed for clarity, the view being taken generally along line 6—6 in FIG. 5; and FIG. 7 is a sectional view taken generally along the line 7—7 in FIG. 3.

DESCRIPTION OF THE PREFERRED EMBODIMENT

Figure 2:
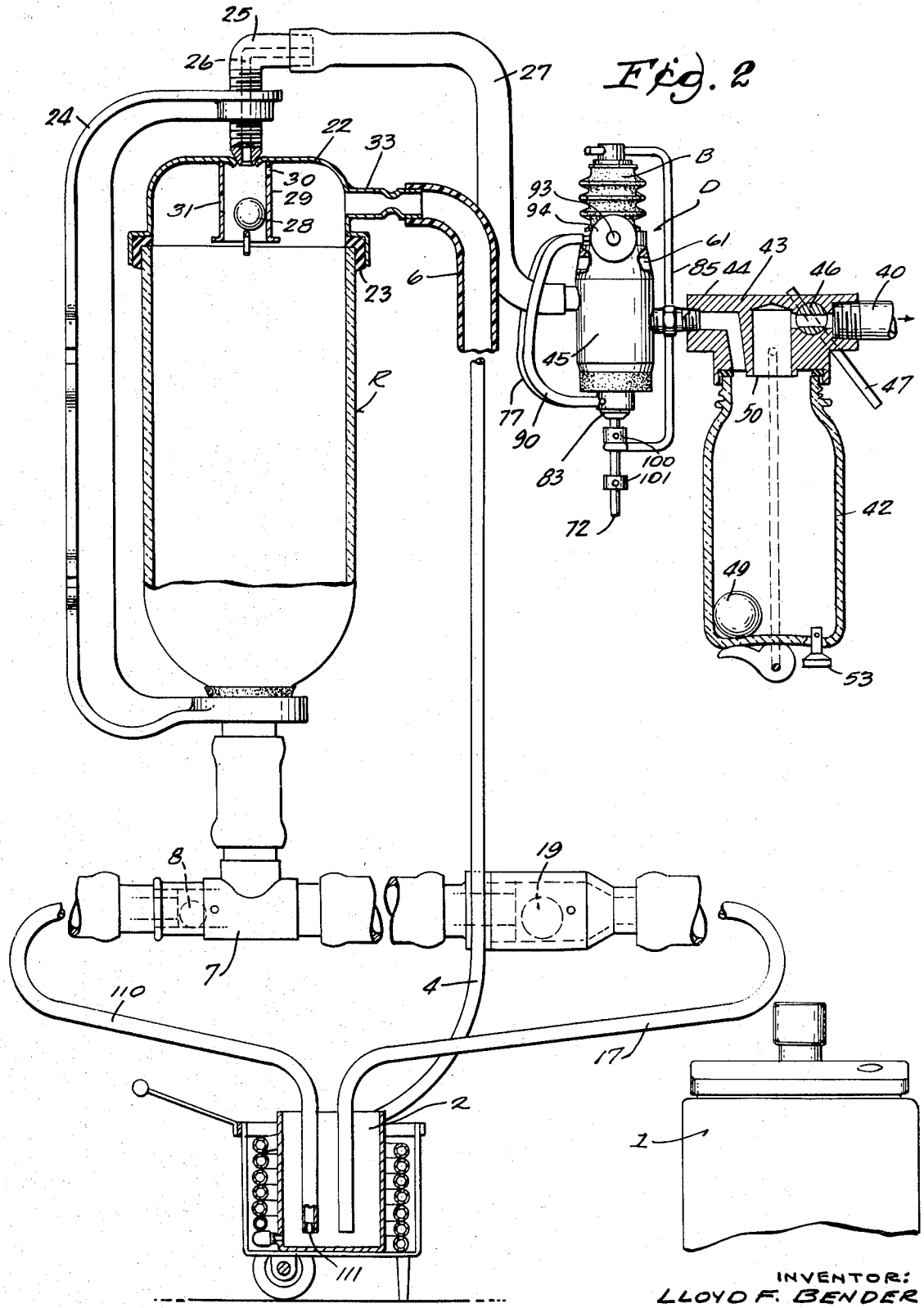
FIG. 2 is a view generally similar to FIG. 1, but showing the parts rearranged for cleaning-in-place the entire apparatus with a cleaning solution.

Referring more specifically to FIG. 1, the apparatus is shown in the fluid conveying position. During the description of this invention, reference will be made to milk as the fluid being conveyed, but it should be understood that any fluid can be conveyed by the present apparatus. The invention, however, has found particular utility in the dairy industry and for conveying milk from one station, such as a transfer tank, to another station, such as a bulk storage or cooling tank for the milk. In that industry it is also absolutely essential to completely and thoroughly clean the equipment after use and the present invention finds particular utility in this respect also, in that it is capable of providing cleaning-in-place for the entire apparatus.

TRANSFER AND STORAGE TANKS

As shown n FIG. 1, a bulk storage or cooler tank 1 is located in one area, such as in the milkhouse of a dairy barn. A portable transfer tank 2 is used to collect the milk from the teat cups or other milking equipment for subsequent transfer to the cooler. This portable tank 2 is also provided with a rack 3 in which a considerable length of flexible tubing 4 can be stored by winding it around the outside of the tank 2. The tubing 4 may be of considerable length, say for example 100 feet, and it must be thoroughly cleaned after use. The tubing 4 is secured at its lower end to the nipple 5 in communication with the lower end of the tank 2. The other end of the flexible tubing 4 is removably attached to the one end of a T-joint 7 wherby the milk in tank 2 can be conducted upwardly into the receiver R. A one-way check ball 8 is provided in the T-joint so that the fluid can flow only in one direction, that is from the tank 2 and into the receiver R. The ball 8 acts against the end 9 of the adapter 10 to prevent return flow of the fluid to tank 2. A stop pin 11 limits movement of the ball in the other direction. Another conduit 15 connects the other leg 16 of the T-joint 7 to a conduit 17 and thus the fluid from the receiver R, at the appropriate time, is discharged via conduit 17 into the milk cooler. A one-way check ball 19 is also provided between the receiver and conduit 17 so as to prevent return flow of fluid from the cooler into the receiver. The one-way check balls may be of the type shown in my U.S. Pat. No. 3,352,248 of Nov. 14, 1967 or in my U.S. Pat. No. 3,424,-098 of Jan. 28, 1969. It is believed sufficient to say however, that various types of one-way check valves may be used, but the present type lends itself to and finds considerable utility with dairy equipment which requires it to be cleaned-in-place.

RECEIVER

The fluid receiver R may be of any shape, but is shown as an elongated cylinder and these are usually made of transparent materials, such as glass. A metal cover 22 is removably fastened to the top of the receiver and is sealed therewith by a flexible gasket 23. This cover and the gasket may be of the type shown in my U.S. Pat. No. 3,186,428 of June 1, 1965 entitled "Washer-Releaser for Dairy Equipment." Similarly, the supporting bracket 24 for the receiver may be of the type shown in said Pat. 3,186,428 and is adapted to be secured to the wall of the barn or other structure. A right angle elbow 25 is threadably engaged in the upper end of the bracket and its lower end presses downwardly on the cover 22 to hold it in sealing relationship with the main body of the receiver R.

A passage 26 extends through the elbow 25 and a conduit 27 is secured to the free end of the elbow. As will appear, either vacuum or atmospheric pressure is permitted to pass through conduit 27 and into the interior of the receiver R to thereby cause the receiver R to either suck fluid upwardly into the receiver from the tank 2, or alternately permit the fluid to be dumped from the receiver via conduit 17, and into the cooler 1. The receiver also has a check ball 28 located in the cylindrical cage 29 at the upper end of the cover 22 and this ball acts, as will appear, to prevent fluid from splashing upwardly into the elbow 25 and conduit 27 when vacuum is applied. It will also be noted the cylindrical cage 29 has a small aperture 31 extending through its side and intermediate the length of the cage 29. The cap also has a nipple 33 extending from one side and when the device is used as shown in FIG. 1, this vacuum is sealed by the removable cap 34.

A vacuum line 40 extends from a source of vacuum (not shown) and this source of vacuum acts to continually draw a vacuum pressure through conduit 40, as indicated by the arrow in FIG. 1. Conduit 40 is connected to the improved timing device D of the present invention via the moisture trap bottle 42. More specifically, the head 43 of the moisture trap bottle is connected to a threaded nipple 44 that is threadably engaged in the body 45 of the device D. An on-off valve 46 is provided in the head 43 so that the vacuum can be shut off by swinging the valve lever 47 from the position shown in FIG. 1, as for example when the arrangement shown in FIG. 1 is to be converted to the washing arrangement shown in FIG. 2. In any event, the moisture trap bottle 42 contains a check ball 49 which acts to rise against the seat 50 when the liquid level in the bottle 42 has risen to a predetermined amount. In this manner, moisture is prevented from being drawn through conduit 40. In practice however, this checking action of the ball 49 rarely occurs because when the bottle 42 is shut off from the vacuum, the dump valve 53 at the bottom of the bottle permits automatic draining of the bottle periodically.

VACUUM OPERATED TIMING DEVICE

Referring now more specifically to the improved automatic operated timing device D, it is shown in detail in FIGS. 3-7 inclusive. The body 45 of the device has a central, vertical bore 55 in which a shiftable valve spool 56 is slideable. The valve spool 56 has an upper land portion 57 and a lower land portion 58. A small hole 59 extends through the reduced portion of the spool. As shown in FIG. 3, the valve spool is in the downward position at which time air is permitted to pass, as indicated by the arrows, through the ports 60 and 61 in the upper end of the body and pass downwardly through a portion of bore 55 and then out of the nipple 63 and through conduit 27.

When the valve spool is in the upper position as shown in FIG. 4, the free air ports 60 and 61 are blocked from conduit 24 by the spool's upper land 57, and vacuum is permitted to be drawn through conduit 27 from the receiver R and out of the threaded nipple 44.

The shifting movement of the valve spool 56 in either direction occurs very rapidly as will appear later, and acts generally to alternately submit the receiver R to atmosphere thus dumping the fluid, or to vacuum to draw fluid upwardly into the receiver.

Resilient means in the form of a spring 65 is inserted in a bore in the lower portion of the valve spool, and this spring acts to bias the spool to the upper, vacuum applying position.

An expandable means is provided on the top of the device D, and this means takes the form of a flexible bellows B molded from rubber, neoprene or the like. This bellows has a cap 64 which is detachably embraced by the upper end of the bellows. The lower end of the bellows yieldingly embraces the reduced upper neck of the body 45. A hole 64a extends through cap 64 for detachably receiving an actuating rod to be referred to.

The main valve body 45 has a lower portion 66 which is held in sealing relation therewith by a circular, flexible retaining ring 70. The lower portion 66 can be easily removed from the main portion 45 by simply pulling the retaining ring 70 outwardly, thus releasing the parts. The lower portion 66 has a central bore 71 in which a follower rod 72 can slide in a vertical direction. The lower portion 66 also has a series of small holes 73 extending vertically all the way through the portion 66, these holes as shown in FIG. 5 being seven in number. One of these holes 73 is placed in communication with the interior of bellows B, as will appear.

An air passage means is provided for the interior of the bellows B as follows. A right angle hole 74 (FIGS. 5 and 6) extends upwardly from the lower surface of member 66 and then is directed radially outwardly where it communicates with a small nipple 75. This second hole 74 is not in communication with bore 55. A free air tube 77 is connected to the nipple 75 and extends upwardly where it is placed in communication with a passage 78 in the upper portion of body 45. The passage 78 in turn then communicates with the interior of a collapsible, flexible bellows B, that is detachably sealingly fastened to the upper end of the valve body 45. Thus the function of the right angle passage 74 is to admit air to the bellows when disc valve 83 is away from the body 66.

An adjustable needle valve 80 (FIG. 6) is located in passage 78 and by means of the needle's adjustable knob 81, the rate of entry of free air to the bellows can be adjusted. As will appear more clearly hereinafter, one of the reasons for the necessity of the free air adjustment by means of the valve 80 is that a different intake setting is required depending on the length of the flexible fluid conveying conduit being used. For example, if a flexible conduit of 50 feet were being used, it would have less frictional resistance to the flow of fluid than a conduit of a length of 100 feet and accordingly, the receiver R would tend to fill at a faster rate. Therefore, the valve 80 would have to be adjusted to permit a slower flow so that the receiver would not fill too rapidly. As mentioned, however, once this adjustment is made for a particular installation, no further adjustment is needed. The free air tube 77 is effective to convey free air to the interior of the bellows, only when the valve disc 83, that is fixed to the follower rod 72, is moved away from the lower surface of body portion 66, namely, moved away from the right angle hole 74. In other words, when the valve disc 83 is in the position shown in FIG. 6, the hole 74 is closed and the free air tube 77 consequently is unable to supply free air to the interior of the bellows. As will appear momentarily, when free air, that is atmosphere, is admitted to the interior of the bellows, the bellows is free to expand upwardly at a slow rate. Upward movement of the bellows carries with it, the U-shaped actuating rod 85.

A vacuum passage means is provided for admitting vacuum to the interior of the bellows B, at the appropriate time. This vacuum passage means includes a vacuum tube 90, as shown in FIGS. 5 and 6, which is in communication with one of the holes 73 which extend all the way through the valve portion 66. This vacuum tube 90 is also in communication with the interior of the bellows B via the passage 92 in the upper portion of the valve body 45. Another needle valve 93 is provided in passage 92 so as to adjustably set the rate of vacuum being applied to the interior of bellows B. In other words, when the disc valve 83 is in the position shown in FIG. 6, the lower end of holes 73 are sealed and vacuum is drawn from the interior of the bore 55 by conduit 44. Accordingly, vacuum is also being drawn from the interior of the bellows via conduit 90 and holes 73, because of the hole 59 between the lands of the valve spool. Stated otherwise, a constant vacuum is applied to the annular space 59a between the lands of the valve spool, and when the lower ends of holes 73 are sealed by the valve disc 83, the interior of the bellows is also subjected to vacuum via the tube 90 and one of the holes 73 in communication therewith.

When the valve disc 83 has been pushed off from the lower end of the holes 73, then free air is admitted to the bellows through both tubes 77 and 90.

Referring again to the need for the discharge adjustment by means of needle valve 93, this adjustment is required because there is a difference in the amount of discharge time depending on the height of the unit above the cooler 1. In other words, if the unit is set at, say for example 10 feet above the cooler, it will discharge faster than if set at four feet above the cooler, due to the additional six feet of head of fluid in the receiver.

A pair of spaced apart stops 100 and 101 are fixed to the follower rod 72, and the lower end of the bellows rod 85 encircles the rod 72 at a location between the stop and is slidable in relation to the rod 72. The arrangement is such that when the bellows is collapsing in a downward direction due to vacuum being applied to its interior, the bellows rod 85 also travels in a downward direction until it hits the lower stop 101 on follower rod 72. As soon as this contact occurs, the valve disc 83 is caused to pop off the valve face 66a formed by the lower surface of body portion 66. As soon as the valve disc 83 is separated from the portion 66 of the body, the disc 83 and its associated rod 72 drop by gravity to their lower portion in which the upper stop 100 rests on the lower end of actuating rod 85. This spring 65 immediately shoves the valve spool 56 to the upper, vacuum admitting position.

At this time, air is then admitted slowly to the bellows B via both tubes 77 and 90 and this results in slowly expanding, upward movement if the bellows, carrying with it the rod 85 and the valve disc 83. As soon as the valve disc 83 reaches the valve body 66, it again acts to seal the holes 73 and also the right angle hole 74. Sealing the one hole 73 with which the tube 90 is in communication, subjects the bellows to vacuum via tube 90 from the annular space 59a between the valve spool lands. This then sets the device moving in the opposite direction, that is to say the bellows begins to collapse due to the vacuum being applied to its interior and this in turn again causes the bellows rod 85 to begin its downward movement. At this time, the valve spool 66 immediately moves down, due to the constant vacuum from nipple 44.

To reiterate briefly, as soon as the bellows rod 85 has moved downward sufficiently far, it abuts against the lower stop 101, causing the valve disc 83 to be popped off its seating surface on the lower side of body portion 66. Thus, as the bellows completely collapses, it moves the valve 83 downwardly off of the holes 73 and 74, with the cooperation of gravity, and as a result there is no longer any vacuum being applied to the interior of the bellows. Instead free air is admitted to the interior of the bellows via tube 77 and 90. At this time, there is free air at both ends of the spool 56 and the spring 65 snaps the spool upwardly to the on or intake position, that is to say, to the position shown in FIG. 4 where the intake of fluid from the tank 2 can occur due to the fact that vacuum from conduit 44 is being applied to the receiver R.

RÉSUMÉ

In recapitulation, the belows moves slowly in either direction and this movement is metered or adjusted by the needle valves 80 and 93. The shiftable valve spool 56 on the other end moves very fast in either direction. The space 59a between the lands of the spool 56 is always subjected to vacuum from nipple 44 and through hole 59 of the valve spool, thus subjecting the lower end of the valve spool to vacuum when the valve disc 83 is in sealing relationship with the lower end of the body 66.

The above described arrangement is used for conveying fluid from the tank 2 to the cooler 1 by alternately subjecting the receiver R to vacuum and then to atmosphere. In this manner, the receiver, when under vacuum acts to draw fluid up into itself, and then when it is subjected to atmosphere, the fluid is dumped or released into the cooler. This alternate pulsation of the receiver occurs automatically due to the constant vacuum being applied to the timing device D.

CLEANING OPERATION

Reference will now be made to FIG. 2 wherein the arrangement is used to clean the entire system with a cleaning solution. With this arrangement, a cleaning solution in tank 2 is continually and vigorously passed through the entire apparatus as will now appear.

As shown in FIG. 2, the cooler 1 is, of course, not used, but instead the cleaning solution in tank 2 is drawn up through the conduit 4, which is now connected to the nipple 33 at the upper end of the receiver R. In other words, the end of the tube 4 has been disconnected from the T-joint 7 and for the cleaning operation, has been attached to the nipple 33.

Also for the cleaning operation, a separate restrictor tube 110 is inserted in the tank 2 and is connected to the T-joint 7. The lower end of the restrictor tube has a restrictor or orifice member 111 in it which permits only a small amount of washing solution to be sucked up in the tube 110. This small amount of solution is only for the purpose of agitating the check ball 8, that is to say for the purpose of causing the check ball to bobble and prevent it from seating in the usual manner. This permits the check valve and its seat to be thoroughly cleaned. Stated otherwise, pressure from the other side of the ball, together with the restricted flow of conduit 110, causes the ball 8 to bobble around and be thoroughly washed. The metered flow through conduit 110 is just sufficient to maintain the ball 8 off its seat.

Also, as shown for the FIG. 2 washing arrangement, the conduit 17 has been inserted into the tank 2 so that the cleaning fluid will be returned to the tank after it has passed through the receiver.

During the washing cycle, the vacuum is alternately applied to the receiver, causing the washing solution to be intermittently drawn up through the conduit 6. Conduit 6 discharges at the top of the receiver in a vigorous manner so as to thoroughly wash the upper portion of the receiver. Due to the hole 30 in the annular cage 29, the interior of the cage as well as the check ball 28 is also thoroughly cleaned. The cleaning solution then returns via conduit 17 back into the tank 2 and this return movement of course also cleans the check ball 19 and its associated parts. As mentioned, the restrictor tube 110 also permits a metered amount of flow to wash the check ball 8 and the entire T-joint.

The previously mentioned small hole 31 comes into play during the washing operation and its function is to prevent the check ball 28 from seating against the vacumm elbow 28 if an unusually large surge of vacuum pressure is applied.

I claim:

1. A timing device for alternatly permitting vacuum or atmosphere to pass therethrough and comprising; a body having a bore therein; an outlet, a vacuum port and an air inlet formed in said body and in communication with said bore; a shiftable valve element in said bore and shiftable from one position in which (1) said outlet and air inlet are in communication and (2) another position in which said outlet and vacuum port are in communication; resilient means for urging said shiftable valve element to said position where said outlet is in communication with said vacuum port; expandable means mounted on said body; a follower rod shiftably mounted in said body and extending therefrom, said rod having a valve and a pair of spaced stops fixed thereon; said expandable means having a rod secured thereto and for movement therewith, said expandable means rod being in operative sliding connection with said follower rod between said spaced stops for alternate abutment therewith; said body having a first hole extending into communication with said bore, said body also having a second hole which is not in communication with said bore; said rod valve abuttable against said body to seal both of said holes; a vacuum passage means which places the interior of said expandable means incommunication with said first hole; an air passage means which places the interior of said expandable means in communication with said second hole;

whereby when said rod valve is away from said body to thereby open said holes, said passage means admit atmosphere to the interior of said expandable means to cause expansion thereof and consequent movement of said expandable means rod to move said follower rod valve towards said body for sealing with said holes, and said resilient means urges said shiftable valve element to said position in which said vacuum port is in communication with said outlet;

and when said rod valve is in sealing engagement with said body against said holes, said shiftable element is shifted due to vacuum acting thereon to its other position where it places said outlet in communication with said air inlet, and said vacuum passage means admits vacuum from said bore and to the interior of said expandable means to cause slow collapsing thereof and consequent downward movement of its associated rod to subsequently push said follower rod valve away from its sealing position against said holes.

2. A vacuum operated timing device for alternately permitting vacuum or atmosphere to pass therethrough, said device comprising; a body having a bore therein; an outlet, a vacuum port and an air inlet formed in said body and in communication with said bore; a shiftable valve element in said bore and shiftable from one position in which (1) said outlet and air inlet are in communication and (2) another position in which said outlet and vacuum port are in communication; resilient means for urging said shiftable valve element to said position where said outlet is in communication with said vacuum port; an expandable bellows mounted on one end of said body; a follower rod shiftably mounted in said body and extending downwardly therefrom, said rod having a disc valve fixed thereon and also having a pair of spaced stops fixed thereon; said bellows having a rod secured thereto and for movement therewith, said rod being in operative sliding connection with said follower rod between said spaced stops for alternate abutment therewith; said body having a first hole in its lower portion and extending therethrough and into communication with said bore, said body also having a second hole in its lower portion which is not in communication with said bore; said disc valve abuttable against said body to seal both of said holes; a vacuum passage means which places the interior of said bellows in communication with said first hole; an air passage means which places the interior of said bellows in communication with said second hole;

whereby when said disc valve is away from said body to thereby open said holes, said passage means admit atmosphere to the interior of said bellows to cause expansion thereof and consequent movement of said bellows rod to move said disc valve towards said body and its sealing position with said holes, and said resilient means urges said shiftable valve element to said position in which said vacuum port is in communication with said outlet;

and when said disc valve is in sealing engagement with said body and against said holes, said shiftable valve element is shifted due to vacuum acting thereon to its other position where it places said outlet in communication with said air inlet, and said vacuum passage means admits vacuum from said bore and to the interior of said bellows to cause collapsing thereof and consequent downward movement of the associated bellows rod to subsequently push said valve disc away from its sealing position against said holes.

3. A vacuum operated timing device for alternately permitting vacuum or atmosphere to pass therethrough, said device comprising; a body having a central and vertical bore therein; an outlet, a vacuum port for supplying a constant vacuum to said bore, a free air inlet formed in said body and in communication with said bore; a shiftable valve spool in said bore and vertically shiftable from one position in which (1) said outlet and air inlet are in communication and (2) another position in which said outlet and vacuum port are in communication; a spring for urging said shiftable valve spool to said position where said outlet is in communication with said vacuum port; an expandable, flexible bellows detachably mounted on one end of said body, a follower rod vertically shiftably mounted in said body and extending downwardly therefrom, said rod having a disc valve fixed thereon and also having a pair of spaced stops fixed thereon; said bellows having an actuating rod secured thereto and for movement therewith, said actuating rod having a sliding connection with said follower rod between said spaced stops for alternate abutment therewith; said body having a first hole in its lower portion and extending therethrough and into communication with said bore, said body also having a second hole in its lower portion which is not in communication with said bore; said disc valve abuttable against said body to seal both of said holes; a vacuum passage means which places the interior of said bellows in communication with said first hole; an air passage means which places the interior of said bellows in communication with said second hole;

whereby when said disc valve is away from said body to thereby open said holes, said passage means admit atmosphere to the interior of said bellows to cause expansion thereof and consequent movement of said actuating rod to move said disc valve towards said body and its sealing position with said holes, and said spring urges said spool to said position in which said vacuum port is in communication with said outlet;

and when said disc valve is in sealing engagement with said body and against said holes, said spool is shifted due to the constant vacuum acting in said bore to its other position where said spool places said body outlet in communication with said free air inlet, and said vacuum passage means admits vacuum from said bore and to the interior of said bellows to cause collapsing thereof and consequent downward movement of its associated actuating rod to subsequently push said valve disc away from its sealing position against said holes.

4. Fluid conveying apparatus comprising, a fluid receiver, a first fluid tank, a second fluid tank, conduit means connected between said tanks and adjacent a lower end of said receiver, one-way check valve means in said conduit means for permitting fluid flow only from said first tank to said receiver and from said receiver to said second tank, a vacuum conduit connected to said receiver adjacent an upper portion thereof, and a vacuum operated timing device connected to said vacuum conduit for alternately subjecting said receiver to vacuum and to atmosphere to thereby, respectively, cause fluid to be drawn up into said receiver from said first tank and then discharged from said receiver to said second tank, said timing device comprising; a body having a bore therein; an outlet connected to said receiver via said vacuum conduit, a vacuum port for supplying a constant vacuum to said device, an air inlet formed in said body and in communication with said bore; a shiftable valve element in said bore and shiftable from one position in which (1) said outlet and air inlet are in communication and (2) another position in which said outlet and vacuum port are in communication; resilient means for urging said shiftable valve element to said position where said outlet is in communication with said vacuum port; and expandable bellows mounted on one end of said body; a follower rod shiftably mounted in said body and extending downwardly therefrom, said rod having a disc valve fixed thereon and also having a pair of spaced stops fixed thereon; said bellows having a rod secured thereto and for movement therewith, said rod being in operative sliding connection with said follower rod between said spaced stops for alternate abutment therewith; said body having a first hole in its lower portion and extending therethrough and into communication with said bore, said body also having a second hole in its lower portion which is not in communication with said bore; said disc valve abuttable against said body to seal both of said holes; a vacuum passage means which places the interior of said bellows in communication with said first hole; an air passage means which places the interior of said bellows in communication with said second hole; whereby when said disc valve is away from said body to thereby open said holes, said air passage means admit atmosphere to the interior of said bellows to cause expansion thereof and consequent movement of said bellows rod to move said disc valve towards said body and its sealing position with said holes, and said resilient means urges said shiftable valve element to said position in which said vacuum port is in communication with said outlet so that said device admits vacuum to said receiver; and when said disc valve is in sealing engagement with said body and against said holes, said shiftable valve element is shifted due to vacuum acting thereon to its other position where it places said outlet in communication with said air inlet and so that said device admits atmosphere to said receiver, and during which time said vacuum passage means admits vacuum from said bore and to the interior of said bellows to cause collapsing thereof and consequent downward movement of the associated bellows rod to subsequently push said valve disc away from its sealing position against said holes.

References Cited

UNITED STATES PATENTS

| | | | |
|---|---|---|---|
| 2,160,651 | 5/1939 | Erling | 137—105 X |
| 3,209,748 | 10/1965 | Thomas | 137—624.14 X |

ALAN COHAN, Primary Examiner

U.S. Cl. X.R.

137—105, 624.14; 417—147